United States Patent [19]
Yeh

[11] Patent Number: 5,037,203
[45] Date of Patent: Aug. 6, 1991

[54] ASYMMETRIC RING LASER GYROSCOPE AND METHOD FOR DETECTING ROTATION WITH ACENTRIC PHOTOREFRACTIVE CRYSTAL

[75] Inventor: Pochi A. Yeh, Thousand Oaks, Calif.

[73] Assignee: Rockwell International Corporation, El Segundo, Calif.

[21] Appl. No.: 90,717

[22] Filed: Aug. 28, 1987

Related U.S. Application Data

[63] Continuation-in-part of Ser. No. 785,948, Oct. 10, 1985, abandoned.

[51] Int. Cl.[5] .............................................. G01C 19/64
[52] U.S. Cl. ................................................... 356/350
[58] Field of Search ........................... 356/350; 372/94

[56] References Cited

PUBLICATIONS

"Influence of Wave-Front-Conjugated Coupling on the operation of a Laser Gyro", Diels et al., Optical Society of America, 1-1981, pp. 219-221.
"Contra-Directional Two-Wave Mixing in a Photorefractive Media", Yeh, Optics Communications, 5-1983, pp. 323-325.

Primary Examiner—Samuel Turner
Attorney, Agent, or Firm—John J. Deinken

[57] ABSTRACT

An asymmetric ring laser gyroscope includes a laser gain medium for generating a clockwise beam of coherent light and a counterclockwise beam of coherent light, such that the counterclockwise beam is parallel but oppositely directed with respect to the clockwise beam. At least three reflectors constrain the clockwise and counterclockwise beams to propagate in a closed path. A means for detecting the frequency difference between the clockwise and counterclockwise beams is provided. An acentric photorefractive plate is positioned within the closed path such that the c-axis of the plate is parallel to the clockwise and counterclockwise beams in the plate.

10 Claims, 3 Drawing Sheets

ASYMMETRIC RING LASER GYROSCOPE AND METHOD FOR DETECTING ROTATION WITH ACENTRIC PHOTOREFRACTIVE CRYSTAL

RELATED APPLICATIONS

This is a continuation-in-part of U.S. patent application Ser. No. 785,948, filed Oct. 10, 1985, now abandoned.

BACKGROUND OF THE INVENTION

This invention is concerned with eliminating lock-in problems in ring laser gyroscopes.

A mechanical gyroscope utilizes the inertia of a spinning mass to provide a reference direction useful in various applications, such as the navigation of an airplane or a spacecraft. The moving parts required in a mechanical gyroscope, however, introduce some undesirable attributes, such as high drift rates resulting from friction, into the device. The ring laser gyroscope was developed to avoid some of these difficulties.

The ring laser gyroscope maintains a constant frame of reference by circulating massless light waves in a closed path. A typical ring laser gyroscope, for example, consists of a resonant cavity defined by three or four corner mirrors. A gas laser generates a monochromatic light beam which is split into two beams. These beams are made to propagate in clockwise and counterclockwise directions in the cavity. If the gyroscope is rotated about an axis which has a component normal to the plane of the optical path, the frequency of one of the beams will be increased, while the frequency of the other beam will decrease, because of the Doppler effect. The beams can then be extracted from the cavity and combined to produce a beat frequency which can be related to the magnitude and direction of the rotation.

In an inertial frame, the optical path lengths for the clockwise and counterclockwise beams of a conventional ring laser cavity are exactly the same. Thus, when the ring gyroscope lases, the two beams will exhibit exactly the same frequency. If the gyroscope is rotating, the effective optical path lengths for the clockwise and the counterclockwise beams are different. In practice, the two beams tend to oscillate at the same frequency for small rotation rates. This is known as the "lock-in" problem and is due to the coupling of the two beams which results from backscattering of the laser beams by the mirrors in the beam path. Backscattering causes a small amount of light from each laser beam to be transferred to the oppositely traveling wave. At slow rates of rotation, this coupling causes the frequencies of the two beams to lock together at a single frequency, thereby preventing the measurement of slow rotation rates.

The lock-in problem is conventionally avoided by mechanically vibrating the ring cavity or using the magneto-optic effect to cause the two beams to oscillate at different frequencies in an inertial frame. If this frequency difference is made large enough, lock-in will not occur. The art of ring laser gyroscopes would be considerably advanced, however, if the oscillation frequencies could be split with a simpler, more compact, and more reliable technique.

Another technique for reducing the lock-in frequency requires the addition of a wavefront conjugating element to the ring cavity (Diels, U.S. Pat. No. 4,525,843; Diels, et al., Influence of wave-front-conjugated coupling on the operation of a laser gyro, Optics Letters, Volume 6, Page 219 (1981)). The intracavity conjugating element causes a fraction of the energy in each beam to be phase shifted and added to the oppositely-directed beam, thereby introducing a coupling between the counter-rotating beams similar to the coupling caused by backscattering. The phase shifts introduced by the wave front conjugation are cumulative with the phase shifts due to rotation, so that the frequency at which lock-in of the gyro occurs is reduced. Because this wave front conjugation process is symmetrical, however, the phase shift introduced in the clockwise wave by the conjugated coupling is equal in magnitude to the phase shift introduced in the counterclockwise wave and the two frequencies of oscillation remain identical when there is no rotation or rotation at a rate below the threshold value. Consequently, lock-in will still occur at frequencies below the lowered threshold frequency and this technique is thus only a partial solution because it does not completely eliminate the lock-in problem.

SUMMARY OF THE INVENTION

The photorefractive effect in an acentric photorefractive crystal is used to couple the two oppositely directed traveling waves in a ring gyroscope. The nonlocal response of the crystal, which gives rise to the asymmetrical coupling of the waves, results in unequal transmissivities as well as unequal phase shifts when the two waves traverse the photorefractive material. This inequality in phase shifts and transmissivities removes the degeneracy of the modes and leads to a splitting in both oscillation frequency and intensity.

An asymmetric ring laser gyroscope constructed according to this invention includes a laser gain medium for generating a clockwise beam of coherent light and a counterclockwise beam of coherent light. The counterclockwise beam is parallel but oppositely directed with respect to the clockwise beam. At least three reflectors constrain the beams to propagate in a closed path. A means is provided for detecting the frequency difference between the clockwise and counterclockwise beams, and an acentric photorefractive plate is positioned within the closed path such that the c-axis of the plate is parallel to the clockwise and counterclockwise beams.

As long as the c-axis of the plate is not perpendicular to the clockwise and counterclockwise beams in the plate, the plate will nonreciprocally couple the beams, causing a first phase shift in the clockwise beam and a second phase shift different from the first phase shift in the counterclockwise beam.

DESCRIPTION OF THE INVENTION

The photorefractive effect in electrooptic crystals has been widely studied for many applications, including real-time holography, optical data storage, and phaseconjugate wave-front generation. Increasing attention has been focused on utilizing the nonreciprocal energy transfer in two-wave mixing. These new applications include image amplification, vibration analysis, and self-oscillation.

It is known that hologram formation in photorefractive media allows a phase shift between the interference fringes of light and the refractive-index modulation, provided the materials are acentric. This phase shift permits a nonreciprocal steady-state transfer of energy between the light beams. This problem has been formulated and solved by many workers. Most of this work, however, was focused on codirectional coupling, in which the amplitudes of the mixing waves increase or decrease along the direction of their bisector (+z). Contradirectional two-wave mixing in the same photorefractive medium has recently been studied. See Yeh, "Contra-Directional Two-Wave Mixing in Photorefractive Media", Optical Communications, Volume 45, Page 323 (1983). In this coupling, the amplitudes of the waves decrease or increase along a direction which is perpendicular to the bisector of their wave vectors. It is an outstanding feature of this invention to place a thin plate of acentric photorefractive material (e.g., $LiNbO_3$, $LiTaO_3$, $BaTiO_3$, BSO, BGO, KTN, etc.) in the cavity of a ring laser gyroscope with the c-axis of the crystal aligned with the counterrotating beams. This causes the oscillation frequencies as well as intensities of the two beams to be predictably different. By solving the coupled equation for counterpropagating two-wave mixing in a photorefractive crystal and obtaining expressions for the transmissivities as well as the relative phase shifts, the split in the oscillation frequency and the intensity of the ring laser can be calculated.

Although in the preferred embodiment of the invention the c-axis is aligned with the counterrotating beams, this is not essential for the operation of the invention. It is only necessary that the c-axis not be perpendicular to the beams, i.e., the c-axis direction vector must have a component parallel to the beam direction.

Figure 1:
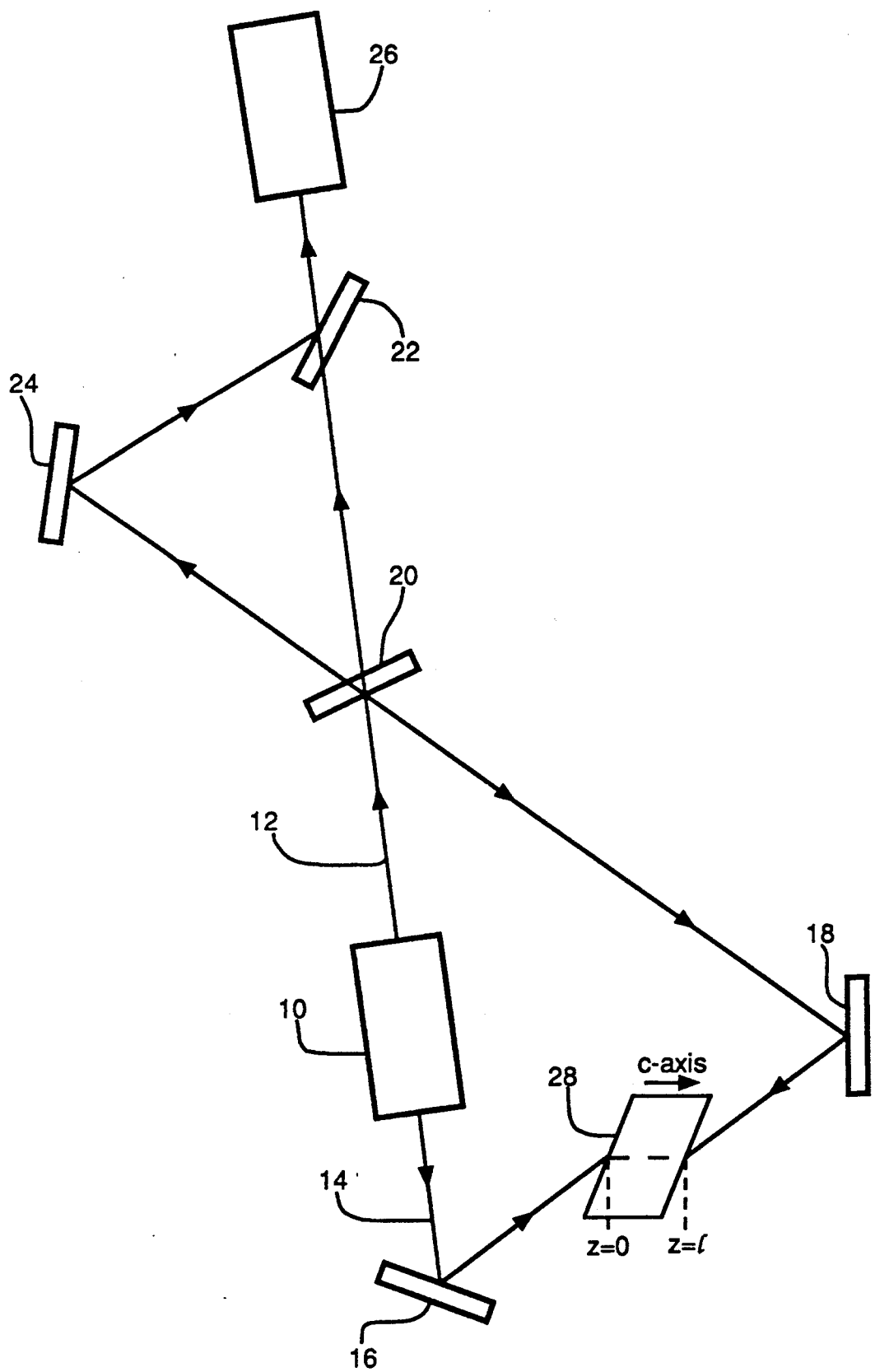
FIG. 1 is a schematic illustrating an asymmetric ring laser gyroscope constructed according to this invention.

FIG. 1 is a schematic diagram illustrating a preferred embodiment of an asymmetric ring laser gyroscope constructed according to the present invention. A laser gain medium 10 generates a clockwise beam of coherent light 12 and a counterclockwise beam of coherent light 14, such that the counterclockwise beam is parallel but oppositely directed with respect to the clockwise beam. Three mirrors 16, 18, and 20 constrain the beams 12 and 14 to propagate in a closed, triangular path. The mirrors 16 and 18 are highly reflective, while the mirror 20 is made partially reflective, so that a portion of the energy in each beam is transmitted through the latter mirror. The transmitted portion of the clockwise beam 12 also propagates through another partially reflecting mirror 22, while the transmitted portion of the counterclockwise beam 14 is reflected by a mirror 24 and is reflected by the mirror 22. Thus both transmitted portions are directed together into a detector 26, which measures the frequency difference between the clockwise and counterclockwise beams. An acentric photorefractive plate 28 is positioned within the closed path such that the c-axis of the plate is parallel to the clockwise and counterclockwise beams in the plate.

In the absence of the photorefractive plate, both beams will oscillate at the same frequency $\nu_o$ and with the same intensity $I_0$ (w/cm$^2$). When the crystal plate of photorefractive material is present in the ring laser cavity, however, an interference pattern is formed inside the plate due to the counterpropagating beams. This interference pattern will generate and redistribute photocarriers. As a result, a periodic space charge field is created inside the crystal. This field will produce an index grating via the Pockels effect. Consequently, a frequency split will be introduced between the two counterpropagating waves, allowing even slow rates of rotation to be measured by the gyroscope without the onset of lock-in between the beams.

The third-order nonlinearity which gives rise to phase conjugation can, because of symmetry, be non-vanishing in any medium, including isotropic materials (gases, liquids, and glasses) as well as cubic crystals. Yariv, et al., Optical Waves in Crystals, Page 553 (John Wiley & Sons, 1984). Not all materials in which phase conjugation can occur, however, are satisfactory for the operation of the present invention. In this invention, the photorefractive crystal must be an acentric or non-centrosymmetric crystal, i.e., a crystal lacking inversion symmetry. Thus the crystal can be selected from the triclinic, monoclinic, orthorhombic, tetragonal, trigonal, hexagonal, or cubic symmetry classes. Yariv, Pages 227–229. This requirement ensures, as explained further below, that the frequency split between the counterpropagating waves will not be symmetric, which in turn will cause lock-in to be eliminated even at a zero rotation rate.

The manner in which this invention eliminates lock-in can be explained by considering the propagation of electromagnetic waves in a ring resonator. In the region occupied by the photorefractive crystal plate, the electric field of the two waves can be written:

$$E_j = A_j(z) \exp[i(k_j z - \omega_j t)] + c.c. \quad j = 1,2 \qquad 1)$$

where z is measured along the beam path and $k_1 = -k_2 = k = n_0 2\pi/\lambda$, where $n_0$ is the ordinary index of refraction of the crystal. In Equation 1), it is assumed for simplicity that both waves have the same linear state of polarization and that the beam path is parallel to the c-axis (optic axis) of the crystal. It is further assumed that no optical rotation is present in the material. $A_1$ and $A_2$ are the wave amplitudes and are taken as functions of z only for the steady-state situation.

In the photorefractive medium (from $z=0$ to $z=1$), these two waves generate an interference pattern (which is traveling if $\omega_1 \neq \omega_2$). This pattern may generate and redistribute photocarriers. As a result, a spatial charge field (which is also traveling if $\omega_1 \neq \omega_2$) is created in the medium. This field induces an index volume grating via the Pockels effect. In general, the index grating will have a finite spatial phase shift relative to the interference pattern, which will make the index grating shift toward one of the beams. This asymmetry leads to a nonreciprocal exchange of power, causing one beam to donate and the other beam to accept energy. The net result is that one beam will suffer a loss and the other will experience a gain, leading to a split in the oscillation intensity. Following the notation of Fischer, et al., "Amplified Reflection, Transmission, and Self-Oscillation in Real-Time Holography", Optics Letters, Volume 6, Page 519 (1981), the fundamental component of the intensity-induced grating can be written as:

$$n = n_0 + \frac{n_1}{2} \exp(i\phi) \frac{A_1 A_2^*}{I_0} \exp[i(Kz - \Omega t)] + c.c. \quad (2)$$

where $$I_0 = I_1 + I_2 |A_1|^2 + |A_2|^2 \quad (3)$$

$\phi$ is real, $n_1$ is a real and positive number, $K=2k$, and $\Omega = \omega_1 - \omega_2$. Here again, for the sake of simplicity, a scalar grating is assumed. The phase $\phi$ indicates the degree to which the index grating is shifted spatially with respect to the light interference pattern. According to Huignard, et al., "Coherent Signal Beam Amplification in Two Wave Mixing Experiments with Photorefractive B.S.O Crystals", Optics Communications, Volume 38, Page 249 (1981), $\phi$ and $n_1$ can be written, respectively:

$$\phi = \phi_0 + \tan^{-1}(\Omega \tau) \quad (4)$$

and $$n_1 = \frac{2}{\sqrt{1 + \Omega^2 \tau^2}} \Delta n_s \quad (5)$$

where $\tau$ is the time constant required to build up the holograph grating, $\Delta n_s$ is the saturation value of the photoinduced index change, and $\phi_0$ is a constant phase shift related to the nonlocal response of the crystal under fringe illumination. Both $\Delta n_s$ and $\phi_0$ depend on the grating spacing ($2\pi/K$) and its direction, as well as on the material properties of the crystal, such as its electro-optic coefficient. Expressions for $\Delta n_s$ and $\phi_0$ can be found in Kukhtarev, et al., "Holographic Storage in Electrooptic Crystals. Beam Coupling and Light Amplification", Ferroelectrics, Volume 22, Page 961 (1979) and Feinberg, et al., "Photorefractive Effects and Light Induced Charge Migration in Barium Titanate", Journal of Applied Physics, Volume 51, Page 1297 (1980). In photorefractive media which operate by diffusion only (i.e., no external static field is required), such as, for example, BaTiO$_3$, the magnitude of $\phi_0$ is $\pi/2$, with its sign depending on the direction of the c-axis.

Using Equation 2) for n and the scalar-wave equation, the following coupled equations can be derived by using the parabolic approximation (i.e., assuming slowly varying amplitudes):

$$\frac{d}{dz} A_1 = -i \frac{\pi n_1}{\lambda I_0} \exp(i\phi) |A_2|^2 A_1 \quad (6)$$

$$\frac{d}{dz} A_2 = i \frac{\pi n_1}{\lambda I_0} \exp(-i\phi) |A_1|^2 A_2$$

Now:

$$A_1 = \sqrt{I_1} \exp(i\psi_1) \quad (7)$$

$$A_2 = \sqrt{I_2} \exp(i\psi_2)$$

where $\psi_1$ and $\psi_2$ are phases of the amplitudes $A_1$ and $A_2$, respectively. Using Equations 7) and 3), the coupled equations 6) can be written as:

$$\frac{d}{dz} I_1 = \gamma \frac{I_1 I_2}{I_1 + I_2} \quad (8)$$

$$\frac{d}{dz} I_2 = \gamma \frac{I_1 I_2}{I_1 + I_2}$$

and $$\frac{d}{dz} \psi_1 = -\beta \frac{I_2}{I_1 + I_2} \quad (9)$$

$$\frac{d}{dz} \psi_2 = \beta \frac{I_1}{I_1 + I_2}$$

where:

$$\gamma = \frac{2\pi n_1}{\lambda} \sin\phi \quad (10)$$

$$\beta = \frac{\pi n_1}{\lambda} \cos\phi \quad (11)$$

Note that the Poynting power flow along $+z$ is conserved, i.e.:

$$\frac{d}{dz}(I_1 - I_2) = 0 \quad (12)$$

The solution of Equation 8) is:

$$I_1(z) = -C + \sqrt{C^2 + B \exp(\gamma z)} \quad (13)$$

$$I_2(z) = C + \sqrt{C^2 + B \exp(\gamma z)}$$

where B and C are constants and relate to the boundary conditions. B and C can be expressed in terms of any two of the four boundary values $I_1(O)$, $I_2(O)$, $I_1(l)$, and $I_2(l)$, where l is the length of interaction. In terms of $I_1(O)$ and $I_2(O)$, B and C are given by:

$$B = I_1(O) I_2(O) \quad (14)$$
$$C = [I_2(O) - I_1(O)]/2$$

In practice, it is convenient to express B and C in terms of the incident intensities $I_1(O)$ and $I_2(l)$. In this case, B and C become:

$$B = I_1(O) I_2(l) \frac{I_1(O) + I_2(l)}{I_2(l) + I_1(O) \exp(\gamma l)} \quad (15)$$

$$C = \frac{1}{2} \frac{I_2^2(l) - I_1^2(O) \exp(\gamma l)}{2 I_2(l) + I_1(O) \exp(\gamma l)}$$

According to Equation 8), both $I_1(z)$ and $I_2(z)$ are increasing functions of z, provided $\gamma$ is positive. The transmissivities for the two waves, according to Equations 14) and 15), are:

$$T_1 = \frac{I_1(l)}{I_1(O)} = \frac{1 + m}{1 + m \exp(-\gamma l)} \quad (16)$$

$$T_2 = \frac{I_2(O)}{I_2(l)} = \frac{1 + m}{\exp(\gamma l) + m}$$

where m is the incident intensity ratio $m \equiv I_2(l)/I_1(O)$. Note that $T_1 > 1$ and $T_2 < 1$ for positive $\gamma$. The sign of $\gamma$ depends on the direction of the c-axis. These expressions for transmissivity are formally identical to those describing codirectional coupling even though the spatial variations of $I_1(z)$ and $I_2(z)$ are very different.

With $I_1(z)$ and $I_2(z)$ known, the phases $\psi_1$ and $\psi_2$ can be integrated directly from Equations 9). The phase shifts in traversing through the medium are $kl+\psi_1(l)-\psi_1(O)$ and $kl+\psi_2(O)-\psi_2(l)$ for waves $E_1$ and $E_2$, respectively. These two phase shifts differ by an amount $\Delta=\psi_2(O)-\psi_2(l)-[\psi_1(l)-\psi_1(O)]$ which, according to Equation 9), is given by:

$$\Delta = -\int_o^l d(\psi_1 + \psi_2) = \int_o^l \beta \frac{I_2 - I_1}{I_2 + I_1} dz \quad (17)$$

This difference in phase shift is zero when $I_2(z)=I_1(z)$ between $z=O$ and $z=l$, which corresponds to $C=O$ in Equation 13). Using Equation 13) and carrying out the integration in Equation 17), the following expression for this phase shift difference is obtained:

$$\Delta = \frac{2\beta}{\gamma} \log T_1 - \beta l \quad (18)$$

where $T_1$ is the beam intensity transmissivity given by Equation 16). Note that $\Delta$ can also be written as $\Delta=(2\beta/\gamma)\log T_2+\beta l$. For small couplings, i.e., $\gamma l<<1$, this difference in phase shift can be written approximately as:

$$\Delta = \beta l \frac{m-1}{m+1} - \beta \gamma l^2 \frac{m}{(1+m)^2} \quad (19)$$

The nonreciprocal property of the transmissivity and phase shift in photorefractive media may have important applications in many optical systems. It is known that in linear optical media, the transmissivity as well as the phase shift of beams traversing through a layered structure (including absorbing media) are independent of the side of incidence (the so-called left-and-right incidence theorem). The nonlocal response of the photorefractive crystal, which is responsible for the nonreciprocity, makes it possible to provide asymmetrical mode coupling in the ring laser gyro of this invention.

In a conventional ring laser gyroscope, the oscillation frequency as well as the intensity are the same for the two beams in an inertial frame. The oscillation occurs at those frequencies f:

$$f = N\frac{c}{L} \quad (20)$$

$N =$ integer which lie within the gain curve of the laser medium (e.g., He-Ne). Here L is the effective length of a complete loop, and N is a large integer. For $L \leqq 30$ cm, these frequencies are separated by the mode spacing $c/L \geqq 1$ GHz. Since the width of the gain curve is typically 1.5 GHz due to principally Doppler broadening, the gyro usually oscillates at a single longitudinal mode. When the gyroscope rotates, the effective optical path lengths are different, leading to a difference $\Delta f$ between the frequencies of the laser oscillation for the two beams. The difference is:

$$\Delta f = \frac{4f}{cL} A \cdot \Omega = \frac{4}{\lambda L} A \cdot \Omega \quad (21)$$

where f is the frequency of oscillation in an inertial frame, A is the area of the loop, the $\Omega$ is the angular velocity of the rotation.

The oscillation intensity inside the laser cavity is determined by the gain as well as the loss and is given by:

$$I_0 = K(g_O - g_t) \quad (22)$$

where K is a constant which depends on the laser medium, $g_O$ is the unsaturated gain factor per pass, and $g_t$ is the threshold gain factor. Note that both $g_O$ and $g_t$ are dimensionless. In a conventional ring resonator, the threshold gain for both traveling waves is given by:

$$g_t \propto L - \log R \quad (23)$$

where $\propto$ is the loss constant (including bulk absorption and scattering) and R is the product of the three-mirror reflectivities.

In the presence of photorefractive coupling, the unequal transmissivities make the threshold gains different for the two waves:

$$\begin{aligned} g_{t1} &= \propto L - \log T_1 R \\ g_{t2} &= \propto L - \log T_2 R \end{aligned} \quad (24)$$

where $T_1$ and $T_2$ are the beam transmissivities given by Equations 16). The difference in the threshold gains leads to a split in the oscillation intensity. The fractional difference in the oscillation intensity is given approximately by:

$$\frac{I_2 - I_1}{I_2 + I_1} = \frac{\log T_2 - \log T_1}{2(g_0 - g_t)} = \frac{-\gamma l}{2(g_0 - g_t)} \quad (25)$$

If it is now assumed that the beam intensities are nearly uniform in the photorefractive material (i.e., $\gamma l<<1$), the difference in phase shift $\Delta$ can be written, according to Equations 17) and 25):

$$\Delta = -\frac{\beta \gamma l^2}{2(g_0 - g_t)} \quad (26)$$

This expression agrees with Equation 19), provided $(g_O-g_t)<<2$, which is a legitimate limitation because $(g_O-g_t)$ is typically of the order of $10^{-2}$.

The unequal phase shift for the oppositely directed traveling waves corresponds to different effective optical path lengths for the waves.

This results in a difference $\Omega$ between the angular frequencies of the laser oscillation of the two beams. The difference is $\Omega=\omega_1-\omega_2 c\Delta/L$, which can be written, according to Equations 26), 11), and 10):

$$\Omega = \frac{c}{L} \frac{-l^2}{2(g_0 - g_t)} \frac{2\pi^2}{\lambda^2} n_1^2 \sin\phi\cos\phi \quad (27)$$

Note that $\Omega$ is not zero, provided $\sin\phi \cos\phi=0$. This frequency difference is proportional to $\beta\gamma l^2$. Thus it is possible to choose the thickness l such that $1/\Delta v$ is greater than the response time (e.g., approximately 1 msec for $LiNbO_3$) of the photorefractive material.

Now consider the angular frequency split $\Omega$ for various cases. For the pure diffusion case (i.e., no external electric field) in a photorefractive material, the phase shift $\phi$ is given by $\phi = \pi/2 + \tan^{-1}\Omega\tau$, according to Equation 4) and Huignard, et al., supra. Thus Equation 27) becomes:

$$\Omega = \frac{4\pi^2(\Delta n_s)^2 l^2 c\Omega\tau}{\lambda^2 L(g_0 - g_l)(1 + \Omega^2\tau^2)^2} \tag{28}$$

which has three solutions. The trivial one is $\Omega = 0$, which corresponds to an unsplit oscillation. The other roots are given by:

$$\Omega_0 = \pm \frac{1}{\tau}\left[\frac{2\pi\Delta n_s}{\lambda} l \frac{c\tau}{L(g_0 - g_l)} - 1\right]^{\frac{1}{2}} \tag{29}$$

Taking $\tau = 100$ msec, $L = 30$ cm, $g_0 - g_l = 0.01$, $l = 1$ mm, $\Delta n_s = 10^{-5}$, and $\lambda = -0.6328$ μm, Equation 29) yields $\Omega_0 = 10^3$ sec$^{-1}$, which corresponds to a frequency split of 160 Hz. Whether the ring gyro will oscillate at the same frequency ($\Omega = 0$) or with a split $\Omega_0$, or both, depends upon the mode stability, which is discussed below.

In the general case when the external field is present (i.e., the so-called drift case), the phase $\phi_0$ is given by:

$$\phi_0 = \tan^{-1}\left[\frac{E_d(E_d + E_p) + E_0^2}{E_0 E_p}\right] \tag{30}$$

where $E_O$ is the applied electric field along the grating momentum K, and $E_d$ and $E_p$ are electric fields characteristic of diffusion and maximum space charge, respectively. $E_d = k_B T K/e$ and $E_p = N_T e/K\epsilon$, where K is the grating momentum, $k_B$ is the Boltzmann constant, T is the temperature, e is the electron charge, $N_T$ is the trap density in the photorefractive material, and $\epsilon$ is the dielectric permittivity of the medium. Using Equations 30) and 4), the factor $\sin\phi\cos\phi$ in Equation 27) can be written:

$$\sin\phi\cos\phi = \frac{\Omega\tau(1 - \tan^2\phi_0) + (1 - \Omega^2\tau^2)\tan\phi_0}{(1 + \Omega^2\tau^2)(1 + \tan^2\phi_0)} \tag{31}$$

Consider, for example, a trapping density of $N_T = 10^{15}$ cm$^{-3}$ in a BSO crystal at $T = 300$ K. Using $\lambda = 0.6328$ μm, $n = 2.54$, $\epsilon/\epsilon_0 = 6.5$, and $K = 4\pi n/\lambda$, $E_d = 13$ kV/cm and $E_p = 550$ V/cm. Note that $E_d >> E_p$ in the range of fringe spacing ($\Lambda \sim 0.1$ μm) considered. Assuming an externally applied field of $E_O = 1$ kV/cm, Equation 30) leads to a stationary phase of $\phi_0 = \pi/2 - 0.0031$ ($\tan\phi_0 = 322$). Substituting Equations 31) and 4) for $\sin\phi\cos\phi$ and $n_1$, respectively, in Equation 27) gives:

$$\Omega\tau = \tag{32}$$

$$\frac{c\tau}{L} \frac{l^2}{(g_0 - g_l)} \frac{4\pi^2}{\lambda^2}\Delta n_s^2 \frac{(\Omega^2\tau^2 - 1)\tan\phi_0 + \Omega\tau(\tan^2\phi_0 - 1)}{(1 + \Omega^2\tau^2)^2(1 + \tan^2\phi_0)}$$

Figure 2:
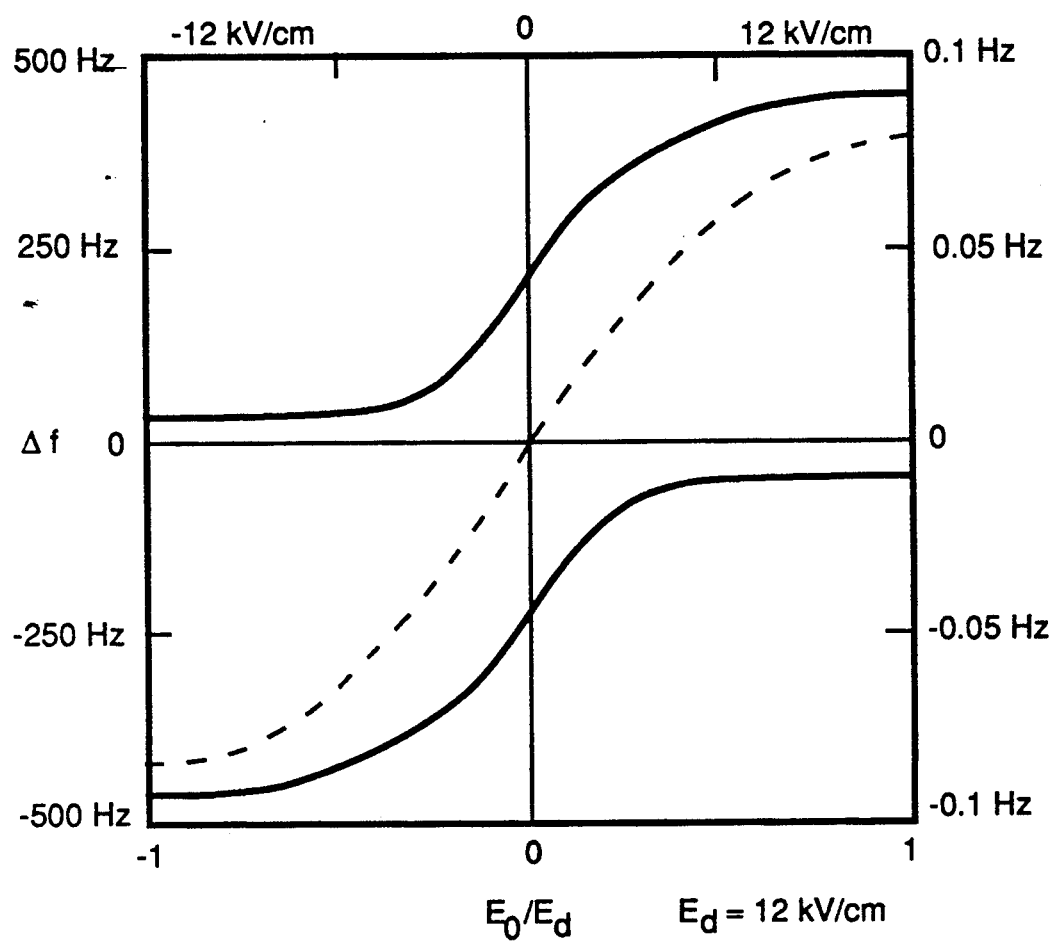
FIG. 2 is a plot of the frequency split induced in a BSO crystal by photorefractive coupling as a function of an applied electric field.

In the practical region of interest (where $\tan\phi_0 >> 1$), Equation 32) has three roots. The small root, which is unstable and thus is of no interest in this invention, is given by $\Omega\tau = \cot\phi_0$, which is virtually zero. The other two roots ($|\Omega\tau| >> 1$) are given approximately by:

$$\Omega_1 = \Omega_0 + \frac{\Omega_0\tau}{4\tan\phi_0 - \Omega_0\tau}\Omega_0 \tag{33}$$

$$\Omega_2 = -\Omega_0 + \frac{\Omega_0\tau}{4\tan\phi_0 + \Omega_0\tau}\Omega_0$$

provided $|\Omega\tau| << \tan\phi_0$ where $\Omega_0$ is given by Equation 29). Note that a small applied field (i.e., $E_O << E_d$ so that $|\Omega\tau| << \tan\phi_0$) has little effect on the frequency split. When the applied field is large enough so that $\tan\phi_0 \sim \Omega\tau$, Equation 32) must be solved numerically for $\Omega\tau$. FIG. 2 shows the frequency split due to photorefractive coupling in a BSO crystal as a function of the applied electric field. The ordinate scale on the right is for the dashed curve, while the ordinate scale on the left is for the solid curves.

The stability of these three oscillation modes will determine the actual mode of oscillation in the steady state. To investigate this issue, the effect of small perturbations on the oscillation frequencies needs to be examined. Using Equation 27) and $\phi = \pi/2 + \tan^{-1}\Omega\tau$, consider that the frequency difference $\Omega$ is slightly deviated from the solution by $\delta\Omega$. This $\delta\Omega$ will change the holographic grating phase shift by $\delta\phi$. Equation 27) will then yield the resulting frequency difference $\Omega + d\Omega$ after substituting $\phi + \delta\phi$ for $\phi$ on the right hand side. The criterion for stable oscillation is:

$$\frac{d\Omega}{\delta\Omega} < 0 \tag{34}$$

Figure 3:
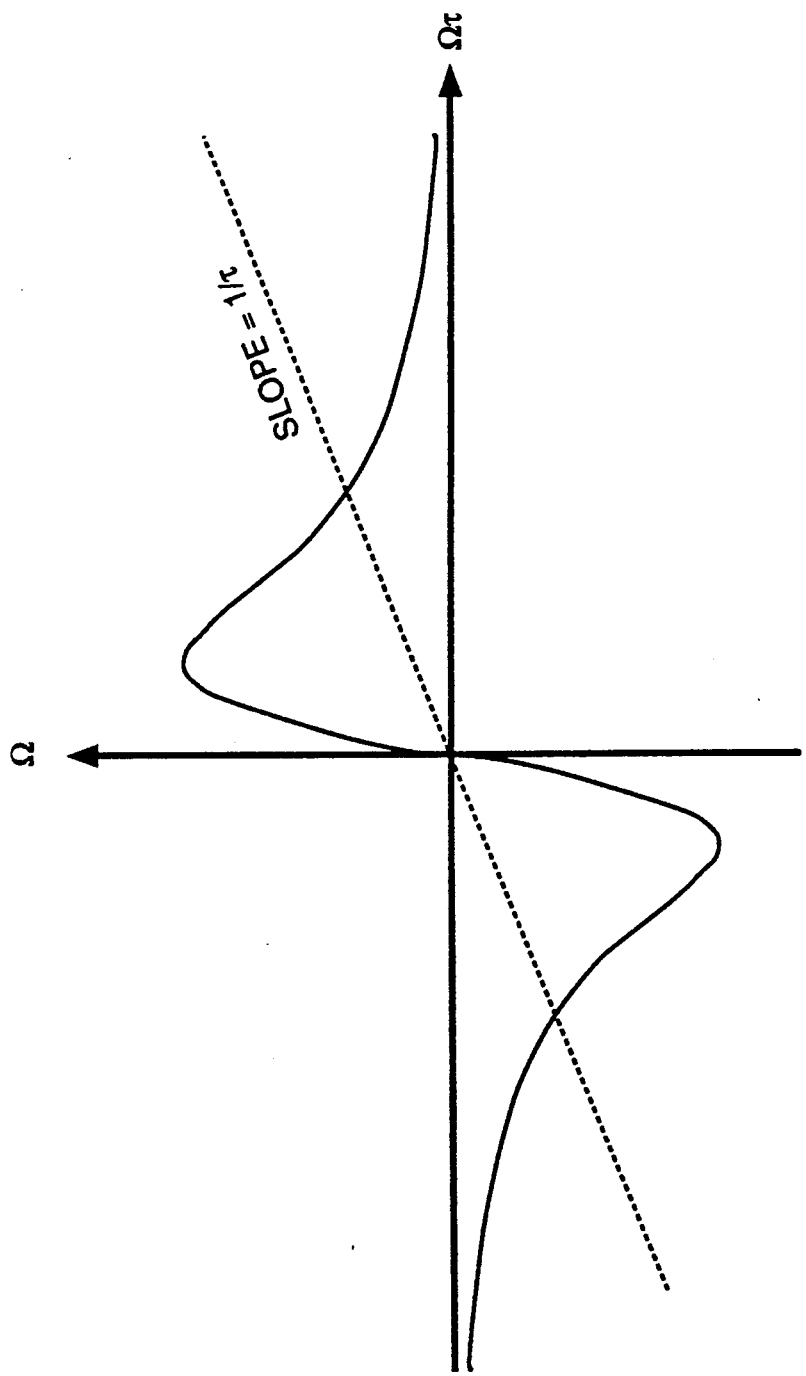
FIG. 3 is a theoretical plot of the frequency difference induced by the photorefractive plate placed in a ring laser gyroscope constructed according to the present invention.

Using Equations 4) and 27), the right hand side of Equation 27) can be plotted as a function of $\Omega\tau$. The solution of Equation 27) can then be obtained by drawing a straight line through the origin with a slope of $1/\tau$. This plot is illustrated in FIG. 3. The intersections of the straight line with the curve give the solutions. The ratio ($d\Omega/\delta\Omega$) is proportional to the slope at the intersections. Note that the solution at $\Omega = 0$ has a positive slope which indicates that this mode of oscillation is unstable according to the criterion of Equation 34). The other two solutions of Equation 29) are stable because they have a negative slope. A negative slope indicates that any deviation $\phi\Omega$ caused by perturbation will eventually damp out. The two roots of Equation 33) for the general case can also be shown to be stable in a similar way.

In conclusion, photorefractive coupling of oppositely directed traveling waves in a ring laser resonator may be utilized to bias a laser gyroscope away from its lock-in region. If the photorefractive crystal is acentric, the nonlocal response of the crystal will lead to unequal transmissivity and phase shifts of the two waves. These, in turn, lead to a split in the oscillation intensity as well as the oscillation frequency. It is this frequency split which may be used to bias the gyro away from lock-in. Those skilled in the art will undoubtedly find additional embodiments and modifications apparent. In the derivation of this phenomenon, for example, the bulk absorption in the photorefractive material is neglected. This is legitimate provided $\alpha << \gamma$, which is generally true in most photorefractive crystals. Furthermore, attenuation in the crystal may affect the difference in phase shift according to Equation 17) because $I_2 I_1$ will no longer be a constant. In the latter case, numerical analysis will be required to account for the attenuation and obtain a more accurate result. In addition, techniques for detecting the frequency difference between the beams are well known to those skilled in the art and thus do not need to be presented in any detail here. Similarly, those skilled in the art will appreciate that many arrangements for introducing counterpropagating beams to the closed path and for extracting the beams from the path for frequency measurements are known in the art. Consequently, the exemplary embodiments should be considered as illustrative, rather than inclusive, and the appended claims are intended to define the full scope of the invention.

The teachings of the following documents referred to herein are incorporated by reference:

Diels, U.S. Pat. No. 4,525,843.

Diels, et al., Influence of wave-front-conjugated coupling on the operation of a laser gyro, Optics Letters, Volume 6, Page 219 (1981).

Fischer, et al., "Amplified Reflection, Transmission, and Self-Oscillation in Real-Time Holography", Optics Letters, Volume 6, Page 519 (1981)

Huignard, et al., "Coherent Signal Beam Amplification in Two Wave Mixing Experiments with Photorefractive B.S.O. Crystals", Optics Communications, Volume 38, Page 249 (1981)

Kukhtarev, et al., "Holographic Storage in Electrooptic Crystals. Beam Coupling and Light Amplification", Ferroelectrics, Volume 22, Page 961 (1979)

Feinberg, et al., "Photorefractive Effects and Light Induced Charge Migration in Barium Titanate", Journal of Applied Physics, Volume 51, Page 1297 (1980)

Yeh, "Contra-Directional Two-Wave Mixing in Photorefractive Media", Optical Communications, Volume 45, Page 323 (1983).

Yariv, et al., Optical Waves in Crystals (John Wiley & Sons, 1984).

I claim:

1. An asymmetric ring laser gyroscope, comprising:
 a laser gain medium for generating a clockwise beam of coherent light and a counterclockwise beam of coherent light, such that the counterclockwise beam is parallel but oppositely directed with respect to the clockwise beam;
 at least three reflectors for constraining the clockwise and counterclockwise beams to propagate in a closed path;
 means for detecting the frequency difference between the clockwise and counterclockwise beams; and
 an acentric photorefractive crystal positioned within the closed path such that the c-axis of the crystal is not perpendicular to the clockwise and counterclockwise beams in the crystal and such that the crystal will nonreciprocally couple the beams, causing a first phase shift in the clockwise beam and a second phase shift different from the first phase shift in the counterclockwise beam.

2. The gyroscope of claim 1, wherein the photorefractive crystal is thick enough that the inverse of the difference in frequency induced between the clockwise and counterclockwise beams by photorefractive coupling in the crystal is greater than the response time of the crystal.

3. The gyroscope of claim 1, wherein the c-axis of the crystal is parallel to the clockwise and counterclockwise beams in the crystal.

4. The gyroscope of claim 1, wherein the photorefractive crystal further comprises a crystal selected from the group consisting of $LiNbO_3$, $LiTaO_3$, $BaTiO_3$, BSO, BGO, and KTN.

5. An asymmetric ring laser gyroscope, comprising:
 a laser gain medium for generating a clockwise beam of coherent light and a counterclockwise beam of coherent light, such that the counterclockwise beam is parallel but oppositely directed with respect to the clockwise beam;
 at least three reflectors for constraining the clockwise and counterclockwise beams to propagate in a closed path;
 means for detecting the frequency difference between the clockwise and counterclockwise beams; and
 an acentric photorefractive crystal positioned within the closed path such that the c-axis of the crystal is parallel to the clockwise and counterclockwise beams in the crystal and such that the crystal will nonreciprocally couple the beams, causing a first phase shift in the clockwise beam and a second phase shift different from the first phase shift in the counterclockwise beam, the crystal being thick enough that the inverse of the difference in frequency induced between the clockwise and counterclockwise beams in the crystal is greater than the response time of the crystal.

6. A method for detecting rotation, comprising the steps of:
 generating a clockwise beam of coherent light and a counterclockwise beam of coherent light, such that the counterclockwise beam is parallel but oppositely directed with respect to the clockwise beam;
 constraining the clockwise and counterclockwise beams to propagate in a closed path;
 positioning an acentric photorefractive crystal within the closed path such that the c-axis of the crystal is not perpendicular to the clockwise and counterclockwise beams in the crystal and such that the crystal will nonreciprocally couple the beams, causing a first phase shift in the clockwise beam and a second phase shift different from the first phase shift in the counterclockwise beam;
 detecting the frequency difference between the clockwise and counterclockwise beams; and
 relating the detected frequency difference to rotation about an axis perpendicular to the plane of the closed path.

7. The method of claim 6, wherein the photorefractive crystal is thick enough that the inverse of the difference in frequency induced between the clockwise and counterclockwise beams by photorefractive coupling in the crystal is greater than the response time of the crystal.

8. The method of claim 6, wherein the c-axis of the crystal is parallel to the clockwise and counterclockwise beams in the crystal.

9. The method of claim 6, wherein the photorefractive crystal further comprises a crystal selected from the group consisting of $LiNbO_3$, $LiTaO_3$, $BaTiO_3$, BSO, BGO, and KTN.

10. A method for detecting rotation, comprising the steps of:
 generating a clockwise beam of coherent light and a counterclockwise beam of coherent light, such that the counterclockwise beam is parallel but oppositely directed with respect to the clockwise beam;
 constraining the clockwise and counterclockwise beams to propagate in a closed path;
 positioning an acentric photorefractive crystal within the closed path such that the c-axis of the crystal is parallel to the clockwise and counterclockwise beams in the crystal and such that the crystal will nonreciprocally couple the beams, causing a first phase shift in the clockwise beam and a second phase shift different from the first phase shift in the counterclockwise beam, the crystal being thick enough that the inverse of the difference in frequency induced between the clockwise and counterclockwise beams in the crystal is greater than the response time of the crystal;

detecting the frequency difference between the clockwise and counterclockwise beams; and relating the detected frequency difference to rotation about an axis perpendicular to the plane of the closed path.

* * * * *